United States Patent Office 2,737,080
Patented Mar. 6, 1956

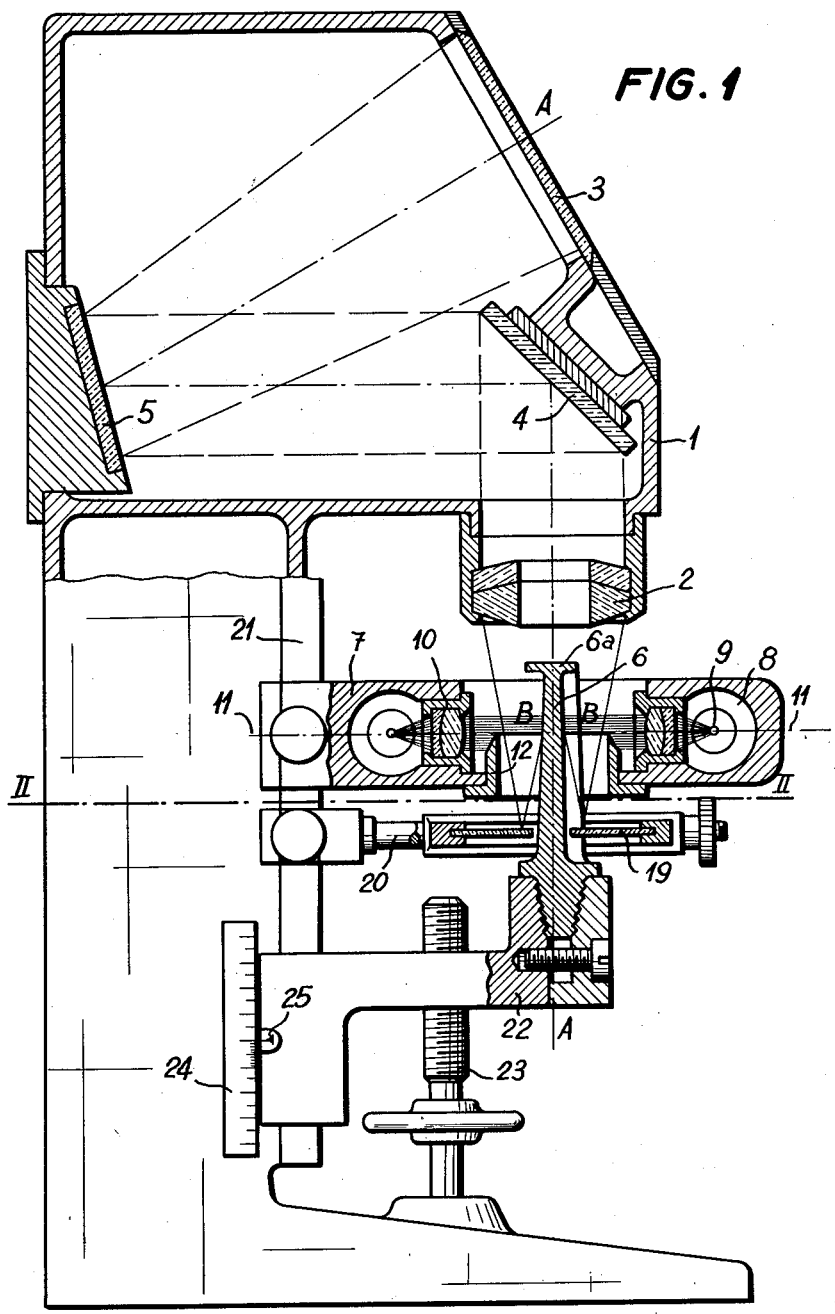

2,737,080

OPTICAL DEVICE FOR EXAMINING THE CROSS-SECTION OF PARTS HAVING AN INTRICATE OUTLINE

André Mottu, Geneva, Switzerland, assignor to Societe Genevoise d'Instruments de Physique, Geneva, Switzerland, a firm of Switzerland Application March 10, 1953, Serial No. 341,498

Claims priority, application Switzerland March 14, 1952

3 Claims. (Cl. 88—24)

My invention has for its object an optical device for examining the cross-section of parts having an intricate outline, such as the blade of a turbine or of a compressor. Such optical devices include as already proposed an objective, a projection screen, illuminating means adapted to produce a flat beam of light converging towards the desired cross-section of the part to be examined and a diaphragm adapted to cut off a portion of the rays of light forming said beam so as to produce a dark area on said part to one side of the plane of the cross-section that is to be checked, and an illuminated area to the other side of said plane.

Such prior arrangements show however the drawback when used for examining a blade provided with a flange or shoulder at its upper end, that consists in the impossibility of checking the shape of the cross-sections near said flange or shoulder.

My invention has for its object to cut out this drawback.

The device according to the present invention is characterized by a mirror perpendicular to the optic axis of said device and surrounding entirely the part to be examined, which extends through said mirror, while the illuminating means are located in a plane located between the objective and said mirror so that the latter is constrained to return, towards the objective, the rays of the flat beam of light reflected by the part undergoing examination onto said mirror.

I have illustrated diagrammatically in accompanying drawings two preferred embodiments of an arrangement according to the invention. In said drawings:

Fig. 1 is a vertical cross-section of a first embodiment, the plane of said cross-section passing through the optical axis A—A of the optical device;

Figure 2:
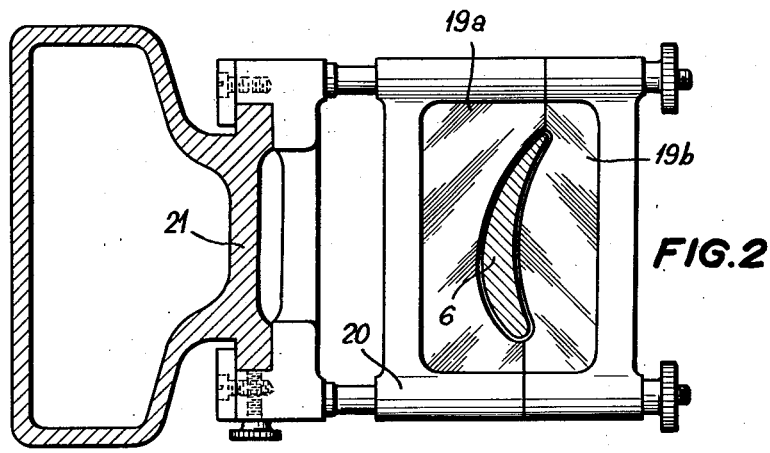
Fig. 2 is a cross-section through line 2—2 of Fig. 1, showing the mirror in plan view.

In the drawings, A—A designates the optical axis of the image-projecting means 1 of the optical device, 2 designates an annular objective which allows projecting on to a screen 3 (Fig. 1) through the agency of the mirrors 4 and 5, images of the part to be examined 6, constituted in the example illustrated by a blade of a turbine or of a turbo-compressor provided with a shoulder or flange 6a at its upper end. A flat luminous beam is produced by a plurality of sources of light lying in a common plane perpendicular to the optical axis and constituted each by an electric bulb 8, the filament of which is concentrated at 9, each bulb being located on the outside of a condenser 10 which projects onto the blade 6 a beam of parallel rays; said condensers and bulbs are carried by a movable support 7 adapted to slide along a vertical slideway 21. The different beams passing out of the condensers 10 are cut off underneath a horizontal plane 11 by a diaphragm 12 assuming the shape of a vertical tube, whereby only the upper part of the blade 6 lying above the upper edge of the diaphragm is illuminated. A mirror 19 including two parts 19a and 19b as shown in Fig. 2 is secured to a movable carrier 20 also adapted to move along the vertical slideway 21; said mirror is located underneath the vertically movable support 7 and extends perpendicularly to the optical axis. Between the parts 19a and 19b of the mirror is defined an opening matching the shape of the blade passing through it. The mirror is mounted in a manner such that its operative reflecting surface faces the objective 2.

The light diffused by the luminous beam impinging on the area B—B of the blade is reflected by the mirror 19 which returns the light rays towards the objective 2, which latter projects onto the screen 3 the image of the area B—B of the blade registering with the cross-section to be examined. In order to obtain an image as luminous as possible, it is necessary for the opening in the mirror 19 to match closely as stated the shape of the outline of the part 6 so as to be able of collecting the major part of the light rays diffused at B—B.

This arrangement allows checking the cross-section located directly underneath the flange or shoulder 6a, which would not be possible with the prior arrangement.

As a matter of fact, in said prior arrangement, luminous rays passing alongside of the part to be examined and reflected towards the objective almost in parallelism with the optical axis of the device are resorted to and consequently, if the cross-section to be examined is comparatively near the shoulder, the latter will cut off such rays and the image of the cross-sections considered disappears partly or completely.

Lastly, the blade 6 is secured inside a work-carrying support 22 which may be shifted by action on the adjusting screw 23 in a direction parallel with the axis A—A so as to allow examination of the transverse outline of the blade at various points of its length. Measuring means such as a scale 24 and a cooperating pointer 25 are provided for defining the exact locations of the different cross-sections of the blade which are to be checked.

Figure 3:
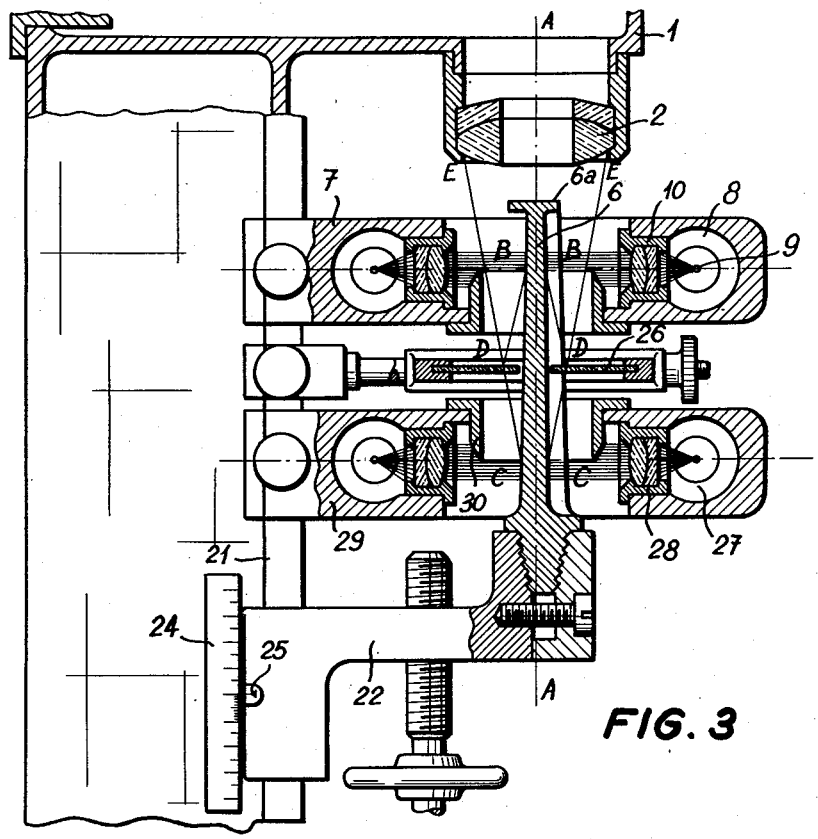
Fig. 3 is a partial cross-section similar to Fig. 1 of a second embodiment.

The second embodiment illustrated in Fig. 3 differs from that which has just been described through the fact that the mirror 19 is replaced by a semi-transparent sheet 26 and also through the fact that further illuminating means comprising bulbs 27, condensers 28 carried by a support 29 and a tubular diaphragm 30 are provided underneath the semi-transparent sheet 26. The latter is thus positioned in a plane located between the two illuminating means. The second illuminating means produce luminous beams of which say the upper parts are cut off by the tubular diaphragm 31 so that consequently only the lower area C—C of the blade portion facing the bulbs 27 is illuminated.

The luminous rays produced by the further luminous means and reflected by the blade 6, pass through the semi-transparent sheet 26 onto the objective 2 which projects on the screen an image of the cross-section of the blade in the area C—C.

The direct optical distance C—D—E of the second flat luminous beam up to the objective is equal to the indirect broken-lined optical distance B—D—E of the first flat luminous beam up to the objective, which allows the simultaneous focusing of the images of the two sections B—B and C—C of the blade 6.

This arrangement allows by means of the simultaneous projection onto the screen of the outline of two cross-sections a simultaneous examination of the two cross-sections. It is thus possible for instance to examine simultaneously the two terminal cross-sections of the blades and thereby to check the modifications in the angles of the leading and trailing edges thereof.

What I claim is:

1. An optical device for examining the cross-sectional shape of an object having a complex profile comprising, in combination, adjustable carrier means for supporting said object, a centrally apertured objective positioned to face the end of the object to be examined, a projection screen on the side of the objective away from the carrier means, compound illuminating means for producing a flat continuous luminous beam lying substantially in a plane perpendicular to the optic axis of the objective and converging toward said axis to impinge on the object to be examined throughout its periphery, said compound illuminating means being adjustable along said axis, a tubular diaphragm coaxial with the axis of the objective adapted to surround a portion of the object to be examined and having a terminal edge at the end facing the objective adapted to intercept to a predetermined extent the flat luminous beam from said illuminating means, a reflecting surface positioned between said carrier and said tubular diaphragm to completely extend around the object to be examined in a direction perpendicular to the optical axis of the objective and being adjustable along said axis and being adapted to reflect the rays of the flat beam reflected from the peripheral area of the object to be examined registering with the portion of the beam passing over the terminal edge of the tubular diaphragm, whereby said rays reflected by said reflecting surface pass on the outside of the object to be examined directly onto the objective and thence onto the projection screen to form on the latter an image of the cross-section of the object to be examined extending in the plane defined by the terminal edge of the tubular diaphragm.

2. An optical device for examining the cross-sectional shape of a part having an intricate outline, comprising adjustable means carrying said part, a centrally apertured objective facing the part to be examined, a projection screen beyond the objective with reference to the carrier means, compound illuminating means producing a flat continuous luminous beam lying substantially in a plane of adjustable location perpendicular to the optic axis of the objective and converging onto said axis to impinge on the part to be examined throughout its periphery, a tubular diaphragm coaxial with the axis of the objective and surrounding a portion of the part to be examined and the terminal edge of which at the end facing the objective engages to a predetermined extent inside the flat luminous beam, a reflecting surface comprising two sections defining between them a central opening to receive the object to be examined with the edges of said opening corresponding closely to the outline of said object, said reflecting surface being positioned between said carrier and said tubular diaphragm to extend around the object to be examined in a direction perpendicular to the optical axis of the objective and being adjustable along said axis and being adapted to reflect the rays of the flat beam reflected from the peripheral area of the object to be examined registering with the portion of the beam passing over the terminal edge of the tubular diaphragm, whereby said rays reflected by said reflecting surface pass on the outside of the object to be examined directly onto the objective and thence onto the projection screen to form on the latter an image of the cross-section of the object to be examined extending in the plane defined by the terminal edge of the tubular diaphragm.

3. An optical device for examining the cross-sectional shape of a part having an intricate outline, comprising adjustable means carrying said part, a centrally apertured objective facing the part to be examined, a projection screen beyond the objective with reference to the carrier means, a first compound illuminating means and a second compound illuminating means disposed on the same side of the objective as the carrier means for producing a pair of flat continuous luminous beams lying substantially in a plane perpendicular to the optic axis of the objective and converging toward said axis to impinge on the object to be examined throughout its periphery, each of said compound illuminating means being adjustable along said axis, two tubular diaphragms coaxial with the axis of the objective adapted to surround each a portion of the object to be examined lying within the corresponding beam and each diaphragm having a terminal edge in the direction away from the other diaphragm adapted to intercept to a predetermined extent on said beam to define the terminal cross-sections of the portions of the object to be examined which are illuminated by said beams, a semi-transparent sheet extending perpendicularly to the optical axis of the objective and mounted for adjustment along said axis between the two flat beams for reflecting the rays of the flat beam lying between the semi-transparent sheet and the objective, said rays being reflected from the peripheral area of the object to be examined registering with the portion of the beam passing over the terminal edge of the corresponding tubular diaphragm directly onto the objective and thence onto the projection screen to form on the latter an image of the area of the object to be examined illuminated by the last-mentioned beam, the rays of the other flat beam impinging on the corresponding peripheral area of the object to be examined and reflected thereby passing through the semi-transparent sheet directly onto the objective and thence onto the projection screen to form on the latter an image of the corresponding area of the part to be examined superimposed upon the first-mentioned image.

References Cited in the file of this patent

UNITED STATES PATENTS

| | | |
|---|---|---|
| 2,256,102 | Reason | Sept. 16, 1941 |
| 2,574,119 | Mottu | Nov. 6, 1951 |
| 2,607,267 | Fultz | Aug. 19, 1952 |
| 2,629,936 | Cronstedt | Mar. 3, 1953 |